(12) United States Patent
Sato et al.

(10) Patent No.: US 11,886,026 B2
(45) Date of Patent: Jan. 30, 2024

(54) OPTICAL FIBER RIBBON, OPTICAL FIBER CABLE, AND CONNECTOR-EQUIPPED OPTICAL FIBER CORD

(71) Applicant: SUMITOMO ELECTRIC INDUSTRIES, LTD., Osaka (JP)

(72) Inventors: Fumiaki Sato, Osaka (JP); Kenta Tsuchiya, Osaka (JP); Masakazu Takami, Osaka (JP); Tsuguo Amano, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/639,755

(22) PCT Filed: Sep. 4, 2020

(86) PCT No.: PCT/JP2020/033635
§ 371 (c)(1),
(2) Date: Mar. 2, 2022

(87) PCT Pub. No.: WO2021/045201
PCT Pub. Date: Mar. 11, 2021

(65) Prior Publication Data
US 2022/0342167 A1    Oct. 27, 2022

(30) Foreign Application Priority Data
Sep. 5, 2019 (JP) .................... 2019-162139

(51) Int. Cl.
*G02B 6/44* (2006.01)

(52) U.S. Cl.
CPC .................. *G02B 6/4403* (2013.01)

(58) Field of Classification Search
CPC .................................... G02B 6/4403
USPC ......................................... 385/114
See application file for complete search history.

(56) References Cited

U.S. PATENT DOCUMENTS

| | | | | |
|---|---|---|---|---|
| 5,848,212 A | * | 12/1998 | Wagman | G02B 6/4408 385/112 |
| 2003/0223718 A1 | | 12/2003 | Khudyakov et al. | |
| 2005/0013573 A1 | * | 1/2005 | Lochkovic | G02B 6/4433 385/128 |
| 2011/0091171 A1 | * | 4/2011 | Tatat | G02B 6/4433 385/105 |
| 2011/0110635 A1 | | 5/2011 | Toge et al. | |
| 2013/0163935 A1 | * | 6/2013 | Sasaki | G02B 6/36 385/77 |
| 2016/0161692 A1 | * | 6/2016 | Namazue | G02B 6/2555 385/114 |

(Continued)

FOREIGN PATENT DOCUMENTS

| | | |
|---|---|---|
| JP | 2000-231042 A | 8/2000 |
| JP | 2005-062427 A | 3/2005 |

(Continued)

*Primary Examiner* — Jerry M Blevins
(74) *Attorney, Agent, or Firm* — Faegre Drinker Biddle & Reath LLP

(57) ABSTRACT

An optical fiber ribbon that includes 16-48 parallel optical fiber core wires and a connecting resin that connects adjacent optical fiber core wires. The outer diameter D of the optical fiber core wires is 160-220 μm, and when N is the number of optical fiber core wires and S is the bending strain of the optical fiber core wires, $S=0.167 \times N/2 (\%)$ or less.

8 Claims, 11 Drawing Sheets

(56) References Cited

U.S. PATENT DOCUMENTS

| | | | |
|---|---|---|---|
| 2017/0115461 A1 | 4/2017 | Namazue et al. | |
| 2017/0184803 A1 | 6/2017 | Namazue et al. | |
| 2019/0011656 A1 | 1/2019 | Sato et al. | |
| 2019/0049681 A1 | 2/2019 | Bookbinder et al. | |
| 2019/0369351 A1* | 12/2019 | Benjamin | G02B 6/4494 |
| 2020/0064550 A1 | 2/2020 | Sato et al. | |
| 2020/0183111 A1 | 6/2020 | Sato et al. | |
| 2020/0218020 A1 | 7/2020 | Namazue et al. | |
| 2020/0379198 A1* | 12/2020 | Fallahmohammadi | G02B 6/4429 |

FOREIGN PATENT DOCUMENTS

| | | |
|---|---|---|
| JP | 2013-88617 A | 5/2013 |
| JP | 2017-32955 A | 2/2017 |
| JP | 2017-517023 A | 6/2017 |
| JP | 2017-223730 A | 12/2017 |
| WO | WO-2015/195177 A2 | 12/2015 |
| WO | WO-2018/105424 A1 | 6/2018 |

* cited by examiner

OPTICAL FIBER RIBBON, OPTICAL FIBER CABLE, AND CONNECTOR-EQUIPPED OPTICAL FIBER CORD

TECHNICAL FIELD

The present disclosure relates to an optical fiber ribbon, an optical fiber cable, and a connector-equipped optical fiber cord.

The present application claims priority from Japanese Patent Application No. 2019-162139 filed on Sep. 5, 2019, contents of which are incorporated by reference in its entirety.

BACKGROUND ART

Patent Literature 1 and 2 disclose an optical fiber ribbon in which a connecting portion at which adjacent optical fibers are connected to each other and a non-connecting portion at which adjacent optical fibers are not connected to each other are intermittently provided in a longitudinal direction between a part or all of the optical fibers.

CITATION LIST

Patent Literature

Patent Literature 1: JP-A-2005-62427
Patent Literature 2: JP-A-2013-88617

Solution to Problem

An optical fiber ribbon according to an aspect of the present disclosure is an optical fiber ribbon including 16 or more and 48 or less optical fibers arranged in parallel, and a connecting resin that connects the adjacent optical fibers, in which an outer diameter of the optical fibers is 160 μm or more and 220 μm or less, and when the number of optical fibers is set to N and a bending strain of the optical fibers is set to S, S=0.167×N/2(%) or less.

An optical fiber cable according to an aspect of the present disclosure is an optical fiber cable in which the optical fiber ribbon is mounted, and the optical fiber cable has an optical fiber density of 4.5 optical fibers/mm² or more.

A connector-equipped optical fiber cord according to an aspect of the present disclosure includes an optical fiber cord including the optical fiber ribbon covered with a sheath, and a connector connected to the optical fiber cord.

TECHNICAL PROBLEM

Figure 1:
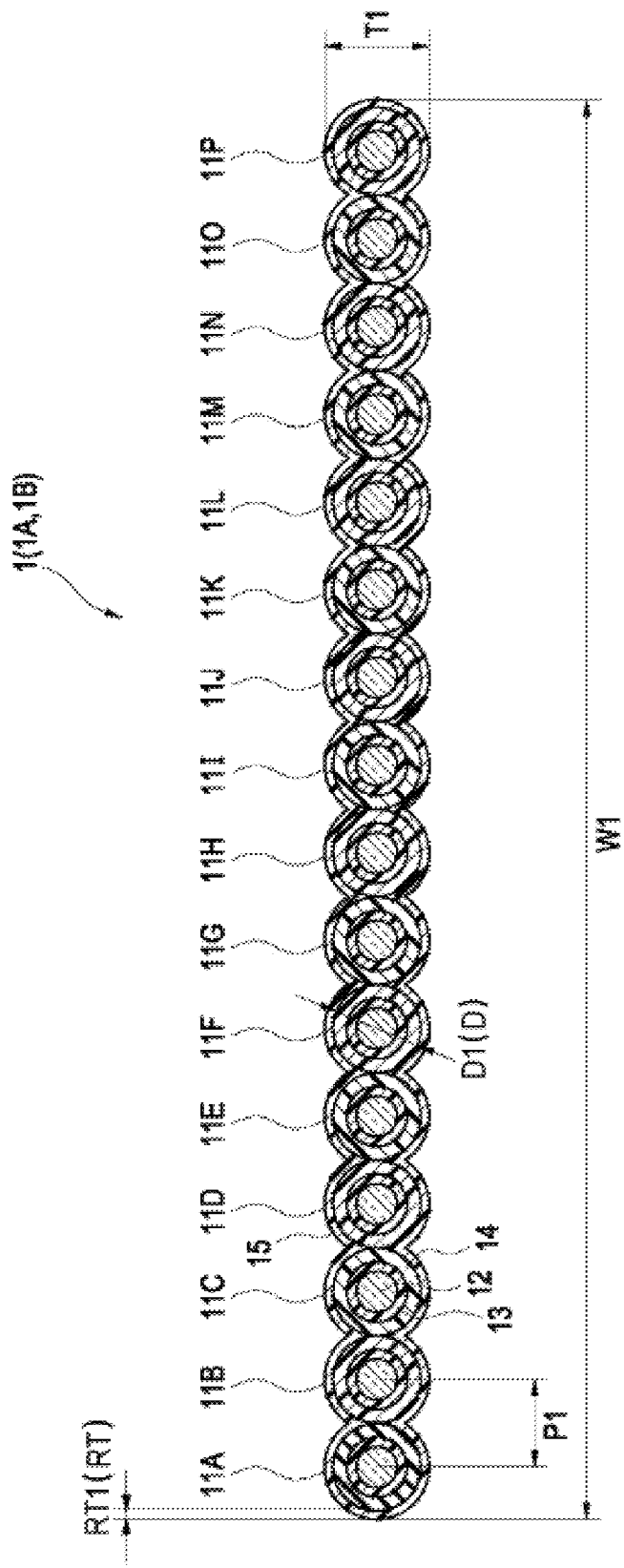
FIG. 1 is a cross-sectional view of an optical fiber ribbon according to a first embodiment of the present disclosure.

In order to further increase a density of an optical fiber cable, an optical fiber ribbon using an optical fiber having a core wire diameter smaller than 250 μm in the related art may be used. When a bending pressure is generated in a direction (width direction) in which the optical fiber ribbons are arranged side by side in the optical fiber cable, bending strain in the optical fibers particularly positioned at an endmost end of the optical fiber ribbons increases. A thin optical fiber has low rigidity. Therefore, a transmission loss may increase due to the optical fibers meandering in the optical fiber cable. In particular, when the number of optical fiber ribbons increases, the transmission loss may significantly increase.

An object of the present disclosure is to provide an optical fiber ribbon, an optical fiber cable, and a connector-equipped optical fiber cord that prevent an increase in transmission loss.

Advantageous Effects of Invention

According to the present disclosure, it is possible to provide an optical fiber ribbon, an optical fiber cable, and a connector-equipped optical fiber cord that can prevent an increase in transmission loss.

DESCRIPTION OF EMBODIMENTS

First, embodiments of the present disclosure will be listed and described.

In an optical fiber ribbon according to an aspect of the present disclosure, (1) the optical fiber ribbon includes 16 or more and 48 or less optical fibers arranged in parallel, and a connecting resin that connects the adjacent optical fibers, in which
an outer diameter of the optical fibers is 160 μm or more and 220 μm or less, and
when the number of optical fibers is set to N,
and bending strain of the optical fibers is S, S=0.167×N/2(%) or less.

When the optical fiber ribbon is mounted on an optical fiber cable, the optical fiber cable may be bent and a bending pressure may be applied thereto. According to the optical fiber ribbon having the above-described configuration, even when the optical fibers (in particular, optical fibers at a position where a curvature radius is the largest when the optical fiber ribbon is bent) constituting the optical fiber ribbon meander in the above-described case, the bending strain is less likely to occur. As a result, the increase in transmission loss may be reduced.

Optical fibers at a position where a curvature radius is the largest is, for example, optical fibers at an endmost end of the optical fiber ribbon that bends outward when the optical fiber ribbons bend in a direction in which the optical fiber ribbons are arranged in parallel (such that one end of the optical fiber is on an inner side and the other end of the optical fiber is on an outer side while maintaining the ribbon in a planar state).

In addition, in a case where the optical fiber ribbons bend in the direction in which the optical fiber ribbons are arranged in parallel at a bending radius R (a radius of a curve line passing through a center in the direction in which the optical fiber ribbons are arranged in parallel), when a distance from a curve line passing through a center to the optical fibers at the endmost end of the optical fiber ribbon that bends outward is r, the bending strain S in the optical fibers at the endmost end is expressed as follows, $$S=100 \times r/R\%.$$

When the optical fiber ribbons bend in the direction along which the optical fiber is arranged in parallel, the bending strain S becomes the largest.

(2) The optical fiber ribbon described above may be an intermittent connection-type optical fiber ribbon in which a connecting portion at which adjacent optical fibers are connected to each other and a non-connecting portion at which adjacent optical fibers are not connected to each other are intermittently provided in a longitudinal direction between a part or all of the optical fibers.

According to the optical fiber ribbon having the above-described configuration, when the optical fiber ribbon is mounted on an optical fiber cable, the optical fiber ribbon is easily gathered in a manner of being rounded in a cross-sectional view. That is, the distance r from the curve line passing through the center to the optical fibers at the endmost end of the optical fiber ribbon tends to be smaller than the distance r when the optical fiber ribbons bend in the parallel direction. Accordingly, since the bending strain S is reduced, the increase in transmission loss of the optical fibers constituting the optical fiber ribbon may be further reduced.

(3) In the optical fibers, when a bending diameter φ is 20 mm with 1 turn, a bending loss at a wavelength of 1550 nm may be 0.75 dB or less, and when the bending diameter φ is 30 mm with 10 turns, the bending loss at the wavelength of 1550 nm may be 0.25 dB or less.

According to the optical fiber ribbon having the above-described configuration, by using the optical fibers having a small bending loss, the increase in transmission loss may be more reliably reduced.

(4) In the optical fibers at both ends of the optical fiber ribbon in the parallel direction, when the bending diameter φ is 15 mm with 1 turn, the bending loss at the wavelength of 1550 nm is 0.5 dB or less, and when the bending diameter φ is 20 mm with 1 turns, the bending loss at the wavelength of 1550 nm is 0.1 dB or less.

Since the increase in transmission loss due to the meandering of the optical fibers becomes more remarkable in the optical fibers at both ends of the optical fiber ribbon, by using the optical fibers having a smaller bending loss for the optical fibers at both ends of the optical fiber ribbon, the increase in transmission loss can be more reliably reduced.

(5) When an outer diameter of the optical fibers is set to D, the number of optical fibers is set to N, and a thickness of a connecting resin covering peripheries of the optical fibers at both ends of the optical fiber ribbon is set to RT, a width W of the optical fiber ribbon in the parallel direction may be equal to or less than a value calculated by following expression, $$W=250 \times (N-1)+D+2 \times RT(\mu m).$$

By reducing the width W of the optical fiber ribbon in the parallel direction, the bending strain S may be reduced.

(6) The number of optical fibers may be a multiple of eight.

Since the optical fibers are generally used in units of eight optical fibers, versatility is easily obtained according to the above-described configuration.

(7) The optical fibers each includes a glass fiber, and two coating layers covering a periphery of the glass fiber, an inner coating layer of the two coating layers is formed of a primary resin, an outer coating layer of the two coating layers is formed of a secondary resin, a Young's modulus of the primary resin at 23° C. is 0.5 MPa or less, and a Young's modulus of the secondary resin at 23° C. may be 1000 MPa or more.

According to the optical fiber ribbon having the above-described configuration, since the Young's modulus of the primary resin is lower than that of the optical fiber in the related art and the Young's modulus of the secondary resin is higher than that of the optical fiber in the related art, a shell effect is improved, and lateral pressure resistance may be improved.

(8) The optical fiber ribbon includes one layer or more of the connecting resin, and a Young's modulus of an outermost connecting resin at 23° C. may be 200 MPa or less, and a breaking elongation may be 30% or more.

According to the optical fiber ribbon having the above-described configuration, since the Young's modulus of the outermost connecting resin at 23° C. is 200 MPa or less, and the breaking elongation is 30% or more, the optical fiber ribbon is easy to deform, and the bending strain may be alleviated.

An optical fiber cable according to an aspect of the present disclosure is (9) an optical fiber cable in which the optical fiber ribbon according to any one of (1) to (8) is mounted, and the optical fiber cable has an optical fiber density of 4.5 optical fibers/mm$^2$ or more.

According to the optical fiber ribbon having the above-described configuration, even if the optical fiber cable in which the optical fiber ribbons having an optical fiber density of 4.5 optical fibers/mm$^2$ or more are mounted at a high density, when the optical fibers constituting the optical fiber ribbon meander in the optical fiber cable, the bending strain is less likely to occur, and thus, the increase in transmission loss may be reduced.

In addition, a connector-equipped optical fiber cord according to an aspect of the present disclosure includes

(10) an optical fiber cord including the optical fiber ribbon according to any one of (1) to (8) covered with a sheath, and a connector connected to the optical fiber cord.

According to the connector-equipped optical fiber cord, when the optical fibers constituting the optical fiber ribbon included in the optical fiber cord meander, the bending strain is less likely to occur, and thus, the increase in transmission loss may be reduced.

DETAILS OF EMBODIMENTS OF THE PRESENT DISCLOSURE

Specific examples of an optical fiber ribbon, an optical fiber cable, and a connector-equipped optical fiber cord according to an embodiment of the present disclosure will be described below with reference to the drawings.

The invention is not limited to these examples, and is defined by the scope of the claims, and is intended to include all modifications within the scope and meaning equivalent to the scope of the claims.

First Embodiment

FIG. 1 is a cross-sectional view perpendicular to a longitudinal direction of an optical fiber ribbon 1 (1A, 1B) according to a first embodiment.

As shown in FIG. 1, in the optical fiber ribbon 1, sixteen optical fibers 11 (11A to 11P) are arranged in parallel. The optical fibers 11A to 11P are arranged in a state in which adjacent optical fibers are at least partially in contact with each other, and the entire optical fibers 11A to 11P are collectively covered and connected by a connecting resin 15.

The optical fibers 11 each includes, for example, a glass fiber 12 including a core and cladding, and two coating layers covering a periphery of the glass fiber 12. An inner coating layer of the two coating layers on an inner side is formed of a primary resin 13. An outer coating layer of the two coating layers on an outer side is formed of a secondary resin 14. A colored layer or the like may be provided outside the two coating layers.

A soft resin having a relatively low Young's modulus is used in the primary resin 13 that is in contact with the glass fiber 12 as a buffer layer. Further, a hard resin having a relatively high Young's modulus is used in the secondary resin 14 as a protective layer. The Young's modulus of the primary resin 13 at, for example, 23° C. is 0.5 MPa or less. The Young's modulus of the secondary resin 14 at, for example, 23° C. is 1000 MPa or more, and preferably 1500 MPa or more. The primary resin 13 and the secondary resin 14 are formed of an ultraviolet curable resin, a thermosetting resin, and the like.

In the optical fibers 11, when a bending diameter φ is 20 mm with 1 turn, a bending loss at, for example, a wavelength of 1550 nm is 0.75 dB or less, and when the bending diameter φ is 30 mm with 10 turns, the bending loss at the wavelength of 1550 nm is 0.25 dB or less. In the optical fibers 11A, 11P disposed at both ends of the optical fiber ribbon 1 in a direction in which the optical fibers 11 are arranged in parallel, when the bending diameter φ is 15 mm with 1 turn, the bending loss at, for example, the wavelength of 1550 nm is 0.5 dB or less, and when the bending diameter φ is 20 mm with 1 turn, the bending loss at the wavelength of 1550 nm is 0.1 dB or less.

The connecting resin 15 is provided in a manner of forming a shape having recessed portions between the optical fibers 11 corresponding to depressions formed between adjacent optical fibers 11. A Young's modulus of the connecting resin 15 at a room temperature (for example, 23° C.) is 200 MPa or less. Further, a breaking elongation of the connecting resin 15 at a room temperature (for example, 23° C.) is 30% or more. As the connecting resin 15, an ultraviolet curable resin, a thermosetting resin, or the like is used. In addition, the connecting resin 15 is preferably formed of a resin containing a silicon-based lubricant, in order to reduce friction with other members disposed around the connecting resin 15. In addition, it is preferable that the connecting resin 15 is a resin having good peelability, in order to facilitate an operation of separating single optical fiber from the optical fibers 11A to 11P.

In the first embodiment, an outer diameter D1 of the optical fibers 11 (11A to 11P) is in a range of 160 μm or more and 220 μm or less. Each thickness RT1 of the connecting resin 15 covering peripheries of the optical fibers 11A, 11P at both ends of the optical fiber ribbon 1 (1A, 1B) is, for example, 15 μm.

For example, when an average value of the outer diameters D1 of the optical fibers 11 is 205 μm, a center-to-center distance P1 between the adjacent optical fibers 11 is 205 μm, a thickness T1 of the optical fiber ribbon 1 is 235 μm, and a width W1 of the optical fiber ribbon 1 in the direction in which the optical fibers 11 are arranged in parallel is 3.310 mm.

Further, when the outer diameter D1 is set to an upper limit value 220 μm of the range, the width W1 is 3.550 mm.

In the first embodiment, the D1 corresponds to D of the present disclosure, and the RT1 corresponds to RT of the present disclosure.

Figure 2:
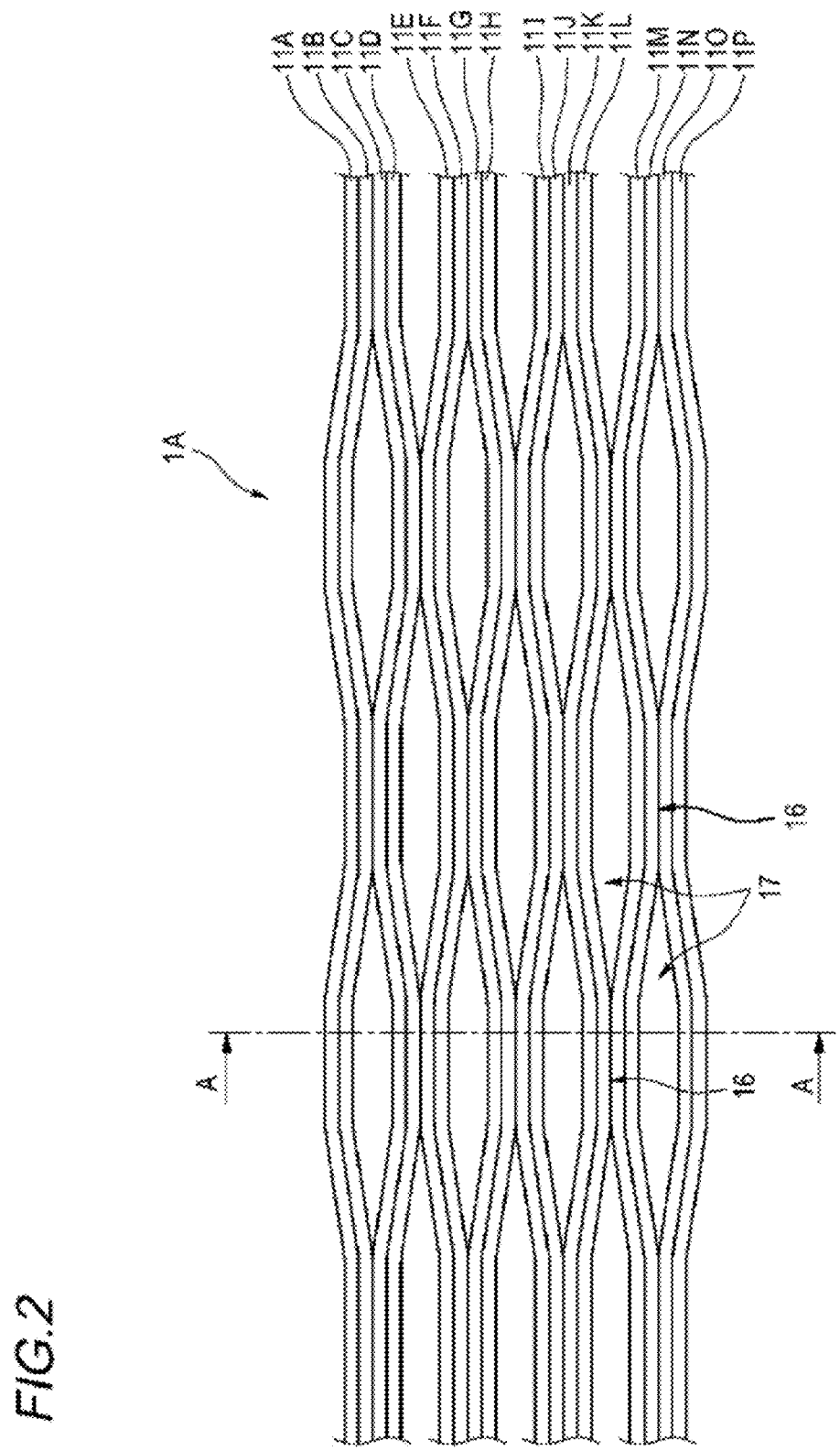
FIG. 2 is a plan view of an example of the optical fiber ribbon shown in FIG. 1.

FIG. 2 is a plan view showing an example of the optical fiber ribbon 1 (optical fiber ribbon 1A).

As shown in FIG. 2, the optical fiber ribbon 1A is an intermittent connection-type optical fiber ribbon in which a connecting portion 16 in which adjacent optical fibers are connected to each other and a non-connecting portion 17 in which adjacent optical fibers are not connected to each other are intermittently provided in the longitudinal direction for each of two optical fibers. In the optical fiber ribbon 1A, the connecting portions 16 and the non-connecting portions 17 are provided between the optical fibers 11B and 11C, between the optical fibers 11D and 11E, between the optical fibers 11F and 11G, between the optical fibers 11H and 11I, between the optical fibers 11J and 11K, between the optical fibers 11L and 11M, and between the optical fibers 11N and 11O.

FIG. 2 shows the optical fiber ribbon 1A in a state in which the non-connecting portions 17 are expanded in the direction in which the optical fibers 11A to 11P are arranged in parallel. In addition, FIG. 1 shows a cross-sectional view taken along, for example, a line A-A of the optical fiber ribbon 1A in a state in which the non-connecting portions 17 are not expanded.

Figure 3:
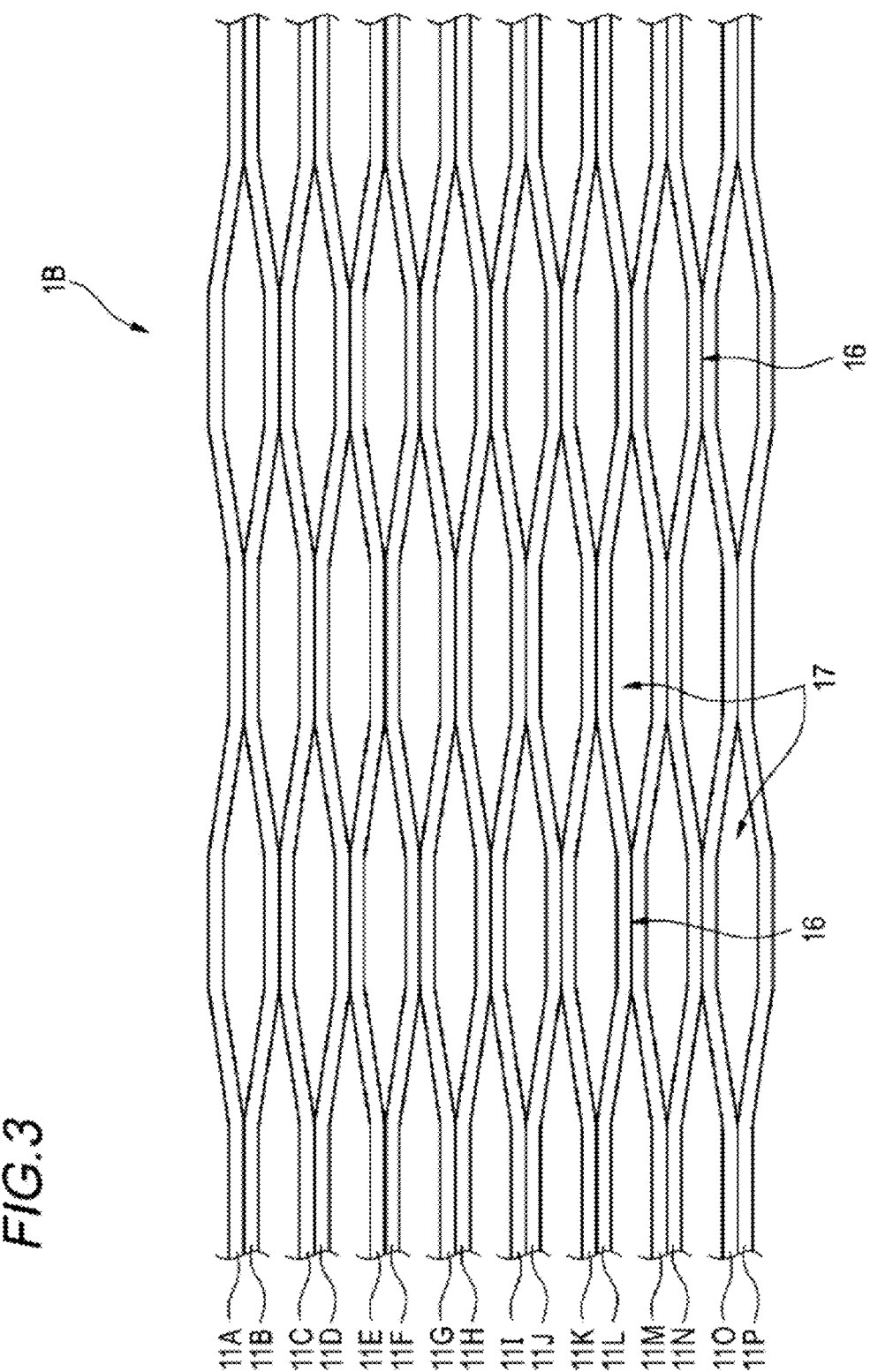
FIG. 3 is a plan view of another example of the optical fiber ribbon shown in FIG. 1.

FIG. 3 is a plan view showing another example of the optical fiber ribbon 1 (optical fiber ribbon 1B).

As shown in FIG. 3, the optical fiber ribbon 1B is an intermittent connection-type optical fiber ribbon in which the connecting portions 16 in which adjacent optical fibers 11 are connected to each other and the non-connecting portions 17 in which adjacent optical fibers 11 are not connected to each other are intermittently provided in the longitudinal direction for all of the optical fibers 11. The configuration of the optical fiber ribbon 1B is the same as the configuration of the optical fiber ribbon 1A described above except for the positions where the connecting portions 16 and the non-connecting portions 17 are provided.

Second Embodiment

Figure 4:
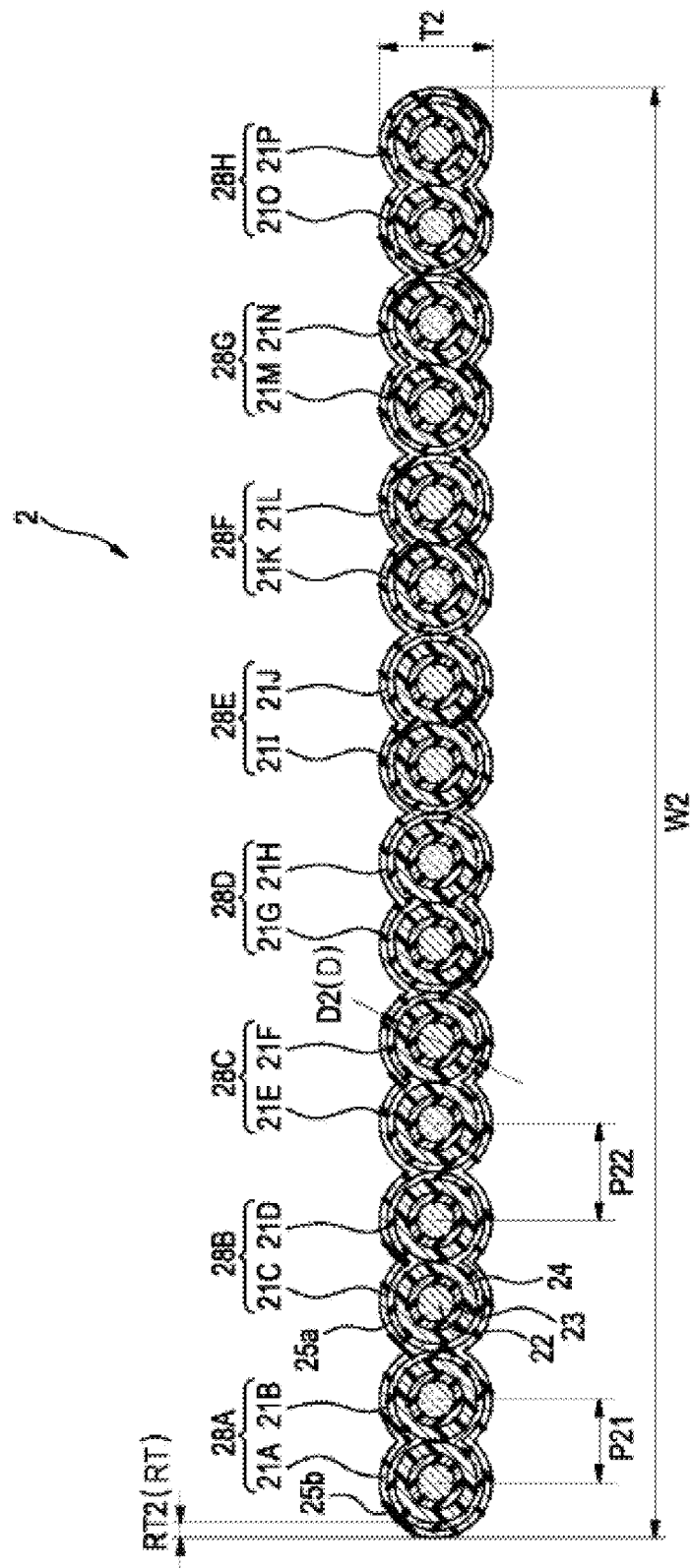
FIG. 4 is a cross-sectional view of an optical fiber ribbon according to a second embodiment of the present disclosure.

FIG. 4 is a cross-sectional view perpendicular to a longitudinal direction of an optical fiber ribbon 2 according to a second embodiment.

As shown in FIG. 4, the optical fiber ribbon 2 includes sixteen optical fibers 21 (21A to 21P).

The sixteen optical fibers 21A to 21P are provided as eight double-core optical fiber ribbons 28 (28A to 28H in this example) integrated by bringing two optical fibers 21 into contact with each other. The double-core optical fiber ribbon 28A includes optical fibers 21A and 21B, and similarly, the double-core optical fiber ribbon 28B includes optical fibers 21C and 21D, the double-core optical fiber ribbon 28C includes optical fibers 21E and 21F, the double-core optical fiber ribbon 28D includes optical fibers 21G and 21H, the double-core optical fiber ribbon 28E includes optical fibers 21I and 21J, the double-core optical fiber ribbon 28F includes optical fibers 21K and 21L, the double-core optical fiber ribbon 28G includes optical fibers 21M and 21N, and the double-core optical fiber ribbon 28H includes optical fibers 21O and 21P.

The double-core optical fiber ribbons 28A to 28H are integrated by applying a connecting resin 25a to surfaces of the two optical fibers 21A and 21B, 21C and 21D, 21E and 21F, 21G and 21H, 21I and 21J, 21K and 21L, 21M and 21N, and 21O and 21P, which are arranged in contact with each other.

The optical fiber ribbon 2 is integrally formed by arranging eight double-core optical fiber ribbons 28A to 28H in parallel and collectively being covered with the connecting resin 25b.

As described above, the connecting resin 25 is formed of two layers including the inner connecting resin 25a covering peripheries of the two optical fibers 21 arranged in contact with each other and an outer connecting resin 25b covering periphery of the inner connecting resin 25a. In the connecting resin 25, a Young's modulus of the outer connecting resin 25b as an outermost layer at a room temperature (for example, 23° C.) is 200 MPa or less, and a breaking elongation at a room temperature (for example, 23° C.) is 30% or more. Other configurations of the connecting resin 25 are the same as those of the connecting resin 15 of the optical fiber ribbon 1A.

The optical fibers 21 each includes a glass fiber 22, a primary resin 23, and a secondary resin 24. Configurations of the glass fiber 22, the primary resin 23, and the secondary resin 24 are the same as the configurations of the glass fiber 12, the primary resin 13, and the secondary resin 14 in the optical fiber ribbon 1A according to the first embodiment. In addition, a bending loss of the optical fibers 21 is the same as the bending loss of the optical fibers 11 of the optical fiber ribbon 1A.

An outer diameter D2 of the optical fibers 21 (21A to 21P) in the second embodiment is in the range of 160 μm or more and 220 μm or less, similarly to the outer diameter of the optical fibers 11 according to the first embodiment. Each thickness RT2 of the connecting resin 25 covering peripheries of the optical fibers 21A, 21P at both ends of the optical fiber ribbon 2 is, for example, 20 μm.

For example, when an average value of the outer diameters D2 of the optical fibers 21 is 205 μm, a center-to-center distance P21 between the optical fibers 21 constituting each of the double-core optical fiber ribbons 28 is 205 μm, and a center-to-center distance P22 between the optical fibers 21 of the adjacent double-core optical fiber ribbons 28 is 225 μm. In this case, a thickness T2 of the optical fiber ribbon 2 is 245 μm, and a width W2 of the optical fiber ribbon 2 is 3.460 mm.

Further, when the outer diameter D2 is set to an upper limit value 220 μm of the range, the width W2 of the optical fiber ribbon 2 is 3.700 mm.

The center-to-center distance P21 is a center-to-center distance between the optical fibers 21A and 21B, 21C and 21D, 21E and 21F, 21G and 21H, 21I and 21J, 21K and 21L, 21M and 21N, and 21O and 21P in FIG. 4.

The center-to-center distance P22 is a center-to-center distance between the optical fibers 21B and 21C, 21D and 21E, 21F and 21G, 21H and 21I, 21J and 21K, 21L and 21M, and 21N and 21O in FIG. 4.

In the second embodiment, the D2 corresponds to the D of the present disclosure, and the RT2 corresponds to the RT of the present disclosure.

The optical fiber ribbon 2 is an intermittent connection-type optical fiber ribbon in which the connecting portion 16 in which adjacent optical fibers 21 are connected to each other and the non-connecting portion 17 in which adjacent double-core optical fiber ribbons 28 are not connected to each other are intermittently provided in the longitudinal direction for each double-core optical fiber ribbon 28.

Third Embodiment

Figure 5:
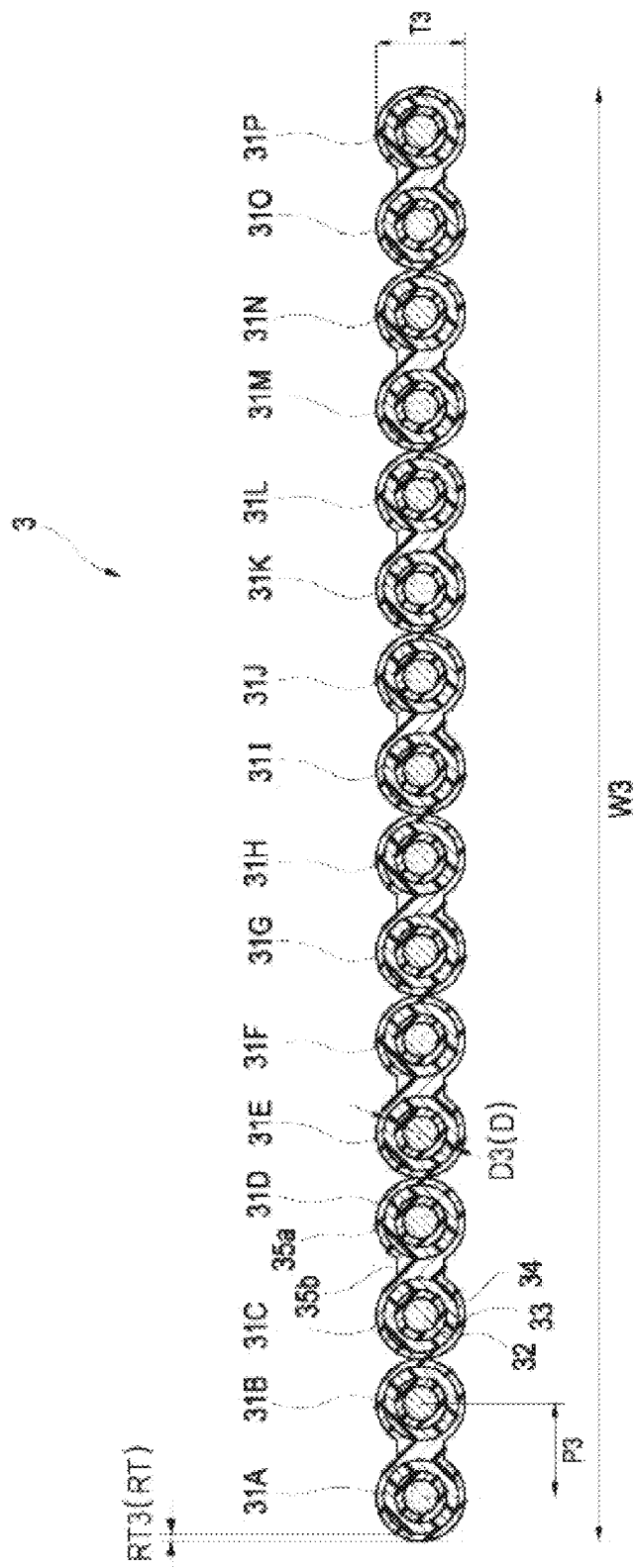
FIG. 5 is a cross-sectional view of an optical fiber ribbon according to a third embodiment of the present disclosure.
Figure 6:
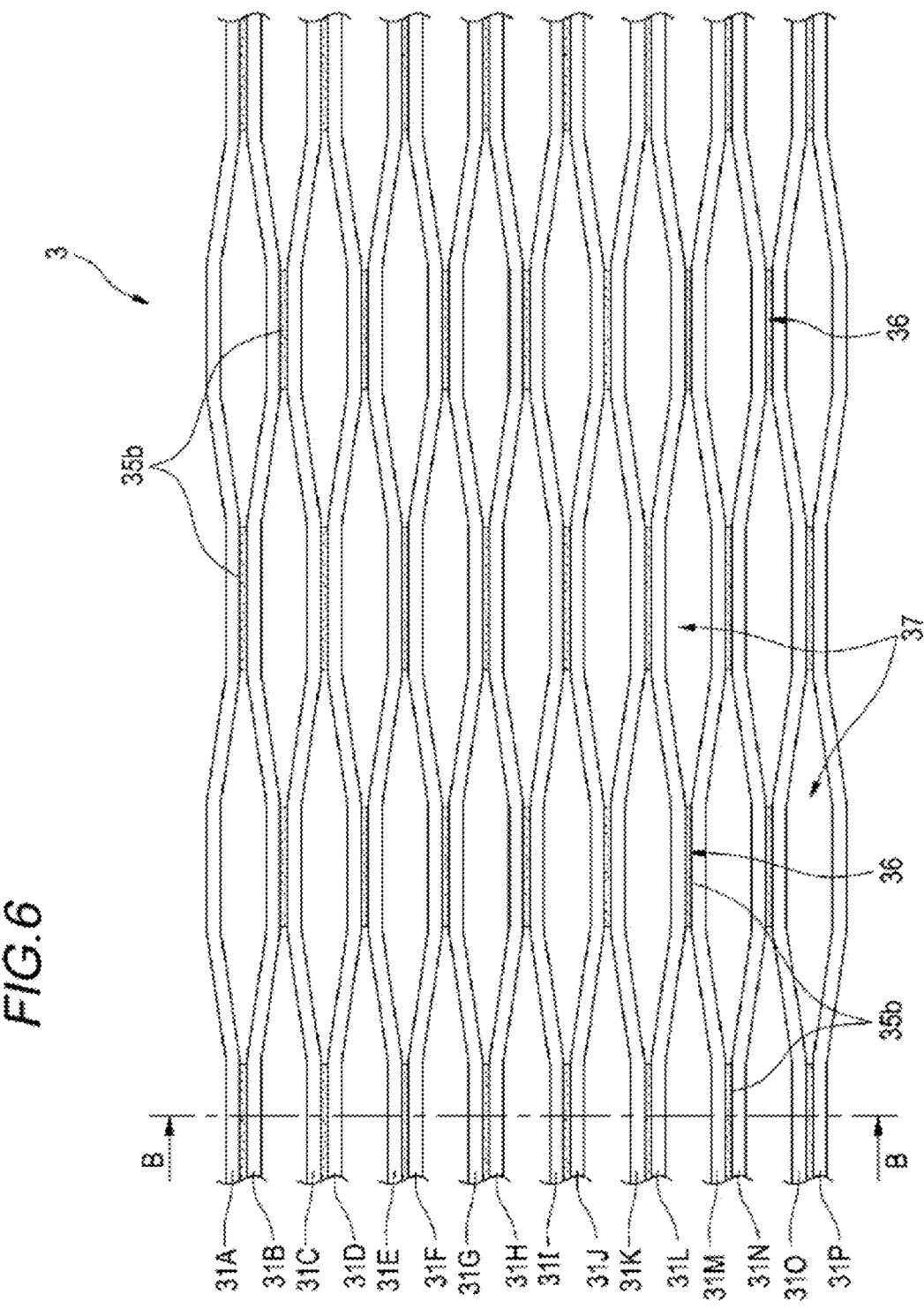
FIG. 6 is a plan view of the optical fiber ribbon shown in FIG. 5.

FIG. 5 is a cross-sectional view perpendicular to a longitudinal direction of an optical fiber ribbon 3 according to a third embodiment. FIG. 6 is a plan view of the optical fiber ribbon 3. FIG. 6 shows the optical fiber ribbon 3 in a state in which non-connecting portions 37 are expanded in a direction in which optical fibers 31A to 31P are arranged in parallel. In addition, FIG. 5 is the cross-sectional view of the optical fiber ribbon 3 taken along a line B-B in a state in which the non-connecting portions 37 are closed.

As shown in FIGS. 5 and 6, the optical fiber ribbon 3 includes sixteen optical fibers 31 (31A to 31P). As shown in FIG. 6, the optical fiber ribbon 3 is an intermittent connection-type optical fiber ribbon in which connecting portions 36 in which adjacent optical fibers are connected to each other and the non-connecting portions 37 in which adjacent optical fibers are not connected to each other are intermittently provided in the longitudinal direction for all of the optical fibers. The connecting portions 36 of the optical fiber ribbon 3 are formed of a connecting resin 35b.

As shown in FIG. 5, the sixteen optical fibers 31A to 31P are arranged in parallel in a state in which adjacent optical fibers 31 are spaced apart from each other by a certain distance. Accordingly, the optical fibers 31 arranged in the state in which adjacent optical fibers 31 are spaced apart from each other by the certain distance are connected to each other by a connecting resin 35a provided in a manner of covering a periphery of each optical fiber 31 and the connecting resin 35b provided in a manner of filling a gap between adjacent optical fibers. The connecting resin 35b constitutes a bridge portion that bridges the adjacent optical fibers 31.

As described above, the optical fiber ribbon 3 is integrated by connecting the optical fibers arranged in parallel and spaced apart from each other by the certain distance by the connecting resins 35a, 35b.

The optical fibers 31 each includes a glass fiber 32, a primary resin 33, and a secondary resin 34. Configurations of the glass fiber 32, the primary resin 33, and the secondary resin 34 are the same as the configurations of the glass fiber 12, the primary resin 13, and the secondary resin 14 in the optical fiber ribbon 1A according to the first embodiment. In addition, a bending loss of the optical fibers 31 is the same as the bending loss of the optical fibers 11 of the optical fiber ribbon 1A.

Young's moduli, breaking elongations, and other configurations of the connecting resins 35a, 35b are the same as those of the connecting resin 15 of the optical fiber ribbon 1A.

An outer diameter D3 of the optical fibers 31 (31A to 31P) in the third embodiment is in the range of 160 μm or more and 220 μm or less, similarly to the outer diameters of the optical fibers 11 according to the first embodiment and the optical fibers 21 according to the second embodiment. Each thickness RT3 of the connecting resin 35a covering peripheries of the optical fibers 31A, 31P at both ends of the optical fiber ribbon 3 is, for example, 15 μm.

In the third embodiment, a center-to-center distance P3 between adjacent optical fibers 31 is approximately 250 μm in any case in which the outer diameter D3 is in the range of 160 μm or more and 220 μm or less. Therefore, a width of the connecting resin 35b provided between adjacent optical fibers 31 (a length in a direction in which the optical fibers 31 are arranged in parallel) varies depending on a value of the outer diameter D3 of the optical fibers 31.

When the outer diameter D3 of the optical fibers 31 is set to an upper limit value 220 μm of the range, a width W3 of the optical fiber ribbon 3 is 4.000 mm.

In the third embodiment, the D3 corresponds to the D of the present disclosure, and the RT3 corresponds to the RT of the present disclosure.

In each of the embodiments, the optical fiber ribbon constituted by sixteen optical fibers is described, but the optical fiber ribbon according to the present disclosure may be formed of 16 or more and 48 or less optical fibers.

Since the optical fiber is generally used in units of eight optical fibers in many cases, the number of optical fibers may be a multiple of eight, such as, 16, 24, 32, and 48.

The optical fiber ribbon according to the present disclosure is not limited to the intermittent connection-type optical fiber ribbon.

When an optical fiber cable on which the optical fiber ribbons are mounted with a high density is bent, a bending pressure is applied to the mounted optical fiber ribbons. The bending pressure becomes maximum when the optical fiber ribbons are bent in a width direction (the direction in which the optical fibers are arranged in parallel), strain due to the bending occurs in each of the optical fibers by the bending pressure, and an increase in transmission loss due to the bending loss may occur.

When the optical fiber ribbons are bent in the direction in which the optical fibers are arranged in parallel, and with reference to a bending strain of an optical fiber arranged in a center of the optical fiber ribbons in the parallel direction, as the optical fiber is arranged away from the center, the strain (hereinafter, referred to as bending strain) generated when the optical fiber ribbons are bent increases. Since a tape width of the optical fiber ribbon increases as the number of optical fibers increases, the bending strain generated in the optical fibers arranged at both ends of the optical fiber ribbon increases as the number of optical fibers increases. When the bending strain generated in the optical fibers arranged at both ends increases, the optical fibers meander by a bending strain to a compression direction that is generated in an optical fiber arranged on an innermost side when the bending occurs in the parallel direction, and the transmission loss due to the bending loss increases. In addition, when the optical fibers have a small diameter of 200 μm or the like, since a rigidity is lower than that of the optical fibers having a diameter of 250 μm in the related art, the meandering of the optical fibers is likely to occur.

The present inventors have studied conditions under which, when the bending pressure is applied to the optical fiber ribbons 1 (2, 3) of the respective embodiments in the direction in which the optical fibers are arranged in parallel, even when the optical fibers 11 (21, 31) meander, the bending strain can be made less likely to occur.

Figure 7:
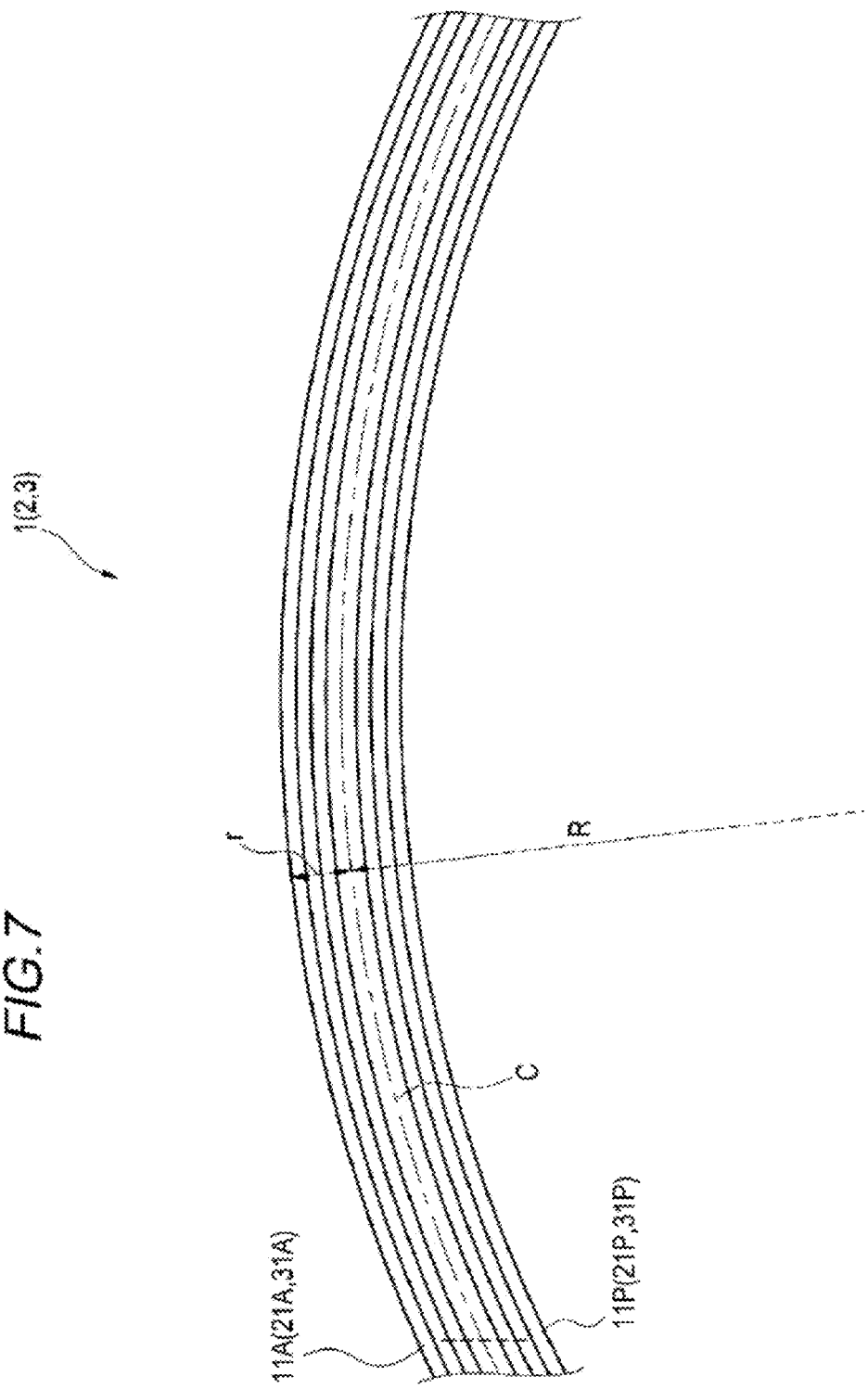
FIG. 7 is a schematic view for illustrating bending strain in a width direction of the optical fiber ribbon.

FIG. 7 is a diagram schematically showing the state in which the optical fiber ribbon 1 (2, 3) is bent in a direction in which the sixteen optical fibers 11 (21, 31) constituting the optical fiber ribbon 1 (2, 3) are arranged in parallel, and the sixteen optical fibers 11 (21, 31) maintain in the state of being parallel. In FIG. 7, in order to simplify the drawing, the number of optical fibers is reduced to illustrate.

FIG. 7 shows a state in which when the optical fiber ribbon 1 (2, 3) is bent in the parallel direction, the optical fiber 11P (21P, 31P) at one end corresponds to an optical fiber on an inner side of the bending. Although each optical fiber ribbon 1 (2, 3) is the intermittent connection-type optical fiber ribbon, in the present study, it is assumed that the state in which the optical fibers are arranged in parallel is maintained when the optical fiber ribbon 1 (2, 3) is bent in the parallel direction (it is not considered that the optical fiber ribbon is rounded in a cross-sectional view).

In this study, as shown in FIG. 7, in the bent optical fiber ribbon 1 (2, 3), a radius of a curve line C passing through a center in the direction in which the optical fibers 11 (21, 31) are arranged in parallel is defined as a bending radius R. Further, a distance (displacement amount) from the curve line C to the optical fiber 11A (21A, 31A) arranged at an endmost end of the optical fiber ribbon 1 (2, 3) that bends outward is defined as a maximum displacement r.

In this case, when the strain generated in the optical fiber 11A (21A, 31A) by the bending in the parallel direction is referred to as a bending strain S, the bending strain S can be expressed by an equation $S=100 \times r/R$ (%) using the maximum displacement r and the bending radius R. The bending strain S is a bending strain generated in the optical fiber at an endmost end in a direction in which the optical fiber ribbon bends outward, and is a maximum value of the bending strain applied to the optical fiber of the optical fiber ribbon.

Next, the bending strain S in the optical fiber ribbon 1 (2, 3) is calculated. In the optical fiber ribbon 1, the maximum displacement is represented by ra, and the bending strain is represented by Sa. In the optical fiber ribbon 2, the maximum displacement is represented by rb, and the bending strain is represented by Sb. In the optical fiber ribbon 3, the maximum displacement is represented by rc, and the bending strain is represented by Sc.

Since each of the maximum displacements ra to rc is the distance from the curve line C to the optical fiber 11A (21A, 31A), each of the maximum displacements ra to rc is ½ of the tape width W1 (W2, W3) of the optical fiber ribbon 1 (2, 3).

In this study, the bending radius R is 150 mm. A value of the bending radius R is assumed to be a bending radius applied to the optical fiber ribbon mounted on the optical fiber cable as compared with a bending radius of bending occurred when general installation is performed in the optical fiber cable.

Calculation results of the maximum displacement and the bending strain of the optical fiber ribbon in each embodiment are as follows.

(1) In the optical fiber ribbon 1 according to the first embodiment,

D1=220 μm, ra=1.775 mm, and Sa=1.183(%).

(2) In the optical fiber ribbon 2 according to the second embodiment,

D2=220 μm, rb=1.830 mm, and Sb=1.220(%).

(3) In the optical fiber ribbon 3 according to the third embodiment,

D3=220 μm, rc=2.000 mm, and Sc=1.333(%).

According to the calculation results of the bending strain S, the bending strain in the optical fiber ribbon 3 according to the third embodiment is the largest value (Sc=1.333(%)). In the optical fiber cable using sixteen optical fiber ribbons, the problem of the increase in transmission loss does not occur as compared with the case in which the bending (maximum bending radius is about 150 mm) occurs when the general installation is performed. Therefore, the value of the bending strain of the optical fiber ribbon 3 is set to a maximum value of bending strains S16 in the optical fiber ribbons according to the present disclosure.

Next, based on the bending strains S16 of the sixteen optical fiber ribbons calculated as described above, a value of the bending strains S corresponding to the number of optical fibers constituting the optical fiber ribbon is obtained. Therefore, a value is obtained by dividing the maximum value (Sc=1.333(%)) of the bending strain S16 by the number (8) of optical fibers from a center of the optical fiber ribbon 3 to the optical fiber 31A at the endmost end.

Then, when a bending pressure is applied to the optical fiber ribbon 1 (2, 3) of the respective embodiments in the parallel direction, even the optical fibers 11 (21, 31) meander, a value obtained by multiplying the obtained value (1.333(%)/8=0.167(%)) by N/2, which is the maximum displacement r of the optical fiber, is set as an upper limit value of the bending strain capable of reducing the transmission loss (N is the number of optical fibers).

Since the optical fiber ribbon 1 (2, 3) is the intermittent connection-type optical fiber ribbon, the optical fiber ribbon 1 (2, 3) is gathered in a manner of being rounded in a cross-sectional view when being mounted on the optical fiber cable. Therefore, the distance r from the curve line C passing through the center of the optical fiber ribbon 1 (2, 3) to the optical fiber 11A (21A, 31A) at the endmost end is reduced. Accordingly, since the bending strain S of the optical fiber ribbon 1 (2, 3) is reduced, the optical fibers 11 (21, 31) constituting the optical fiber ribbon 1 (2, 3) may be further reduced from meandering, and the increase in transmission loss may be further reduced.

In addition, in the optical fibers 11 (21, 31) of the optical fiber ribbon 1 (2, 3), when a bending diameter φ is 20 mm with 1 turn, a bending loss at a wavelength of 1550 nm is 0.75 dB or less, and when the bending diameter φ is 30 mm with 10 turns, the bending loss at the wavelength of 1550 nm is 0.25 dB or less. In this way, by using the optical fibers 11 (21, 31) having a small bending loss, the increase in transmission loss may be more reliably reduced.

In addition, in the optical fibers 11A, 11P (21A, 21P, 31A, 31P) at both ends of the optical fiber ribbon 1 (2, 3) in the width direction, when a bending diameter φ is 15 mm with 1 turn, the bending loss at the wavelength of 1550 nm is 0.5 dB or less, and when the bending diameter φ is 20 mm with 1 turns, the bending loss at the wavelength of 1550 nm is 0.1 dB or less. The increase in transmission loss due to the meandering of the optical fibers 11 (21, 31) becomes more remarkable in the optical fibers 11A, 11P (21A, 21P, 31A, 31P) at both ends of the optical fiber ribbon 1 (2, 3). Therefore, by using the optical fibers having a smaller bending loss for the optical fibers 11A, 11P (21A, 21P, 31A, 31P) at both ends, the increase in transmission loss may be further reliably reduced.

Further, when the outer diameter of the optical fibers 11 (21, 31) is D, the number of optical fibers 11 (21, 31) is N, and the thickness of the connecting resin (15, 25, 35a) covering the peripheries of the optical fibers 11A, 11P (21A, 21P, 31A, 31P) at both ends of the optical fiber ribbon 1 (2, 3) is RT, the width W of the optical fiber ribbon 1 (2, 3) in the parallel direction may be equal to or less than $$W=250\times(N-1)+D+2\times RT(\mu m).$$

As a result, the bending strain S in the optical fiber ribbon 1 (2, 3) can be reduced.

In a core alignment fusion splicer, since the optical fiber ribbons are collectively connected in a state of being arranged in parallel, a size of a fusion portion thereof is a size corresponding to the width of the optical fiber ribbons. As the core alignment fusion splicer, a core alignment fusion splicer in which a width of an optical fiber ribbon including twelve optical fibers having a core wire diameter of 250 μm is adjusted to 3.0 mm to 3.5 mm is generally used. Even in an optical fiber ribbon including sixteen optical fibers as in the optical fiber ribbon 1 (2), as long as the width W1 (W2) is 3.5 mm or less, a commonly used core alignment fusion splicer as described above can be used without preparing a new core alignment fusion splicer.

In addition, since the optical fibers 11 (21, 31) are generally used in units of eight optical fibers in many cases, versatility is easily obtained by setting the number of optical fibers 11 (21, 31) in the optical fiber ribbon 1 (2, 3) to a multiple of eight.

According to the optical fiber ribbon 1 (2, 3), in the optical fibers 11 (21, 31), the Young's modulus of the primary resin 13 (23, 33) at 23° C. is 0.5 MPa or less, and the Young's modulus of the secondary resin 14 (24, 34) at 23° C. is 1000 MPa or more. According to this configuration, since the Young's modulus of the primary resin is lower than that of the optical fiber in the related art and the Young's modulus of the secondary resin is higher than that of the optical fiber in the related art, a shell effect is improved, and lateral pressure resistance of the optical fibers 11 (21, 31) can be improved.

According to the optical fiber ribbon 1 (2, 3), the Young's modulus of the outermost connecting resin 15 (25b, 35a, 35b) at 23° C. is 200 MPa or less, and the breaking elongation is 30% or more. Therefore, the optical fiber ribbon 1 (2, 3) is easy to deform, and the bending strain can be alleviated.

Next, an optical fiber cable according to the present embodiment will be described with reference to FIGS. 8 and 9.

Figure 8:
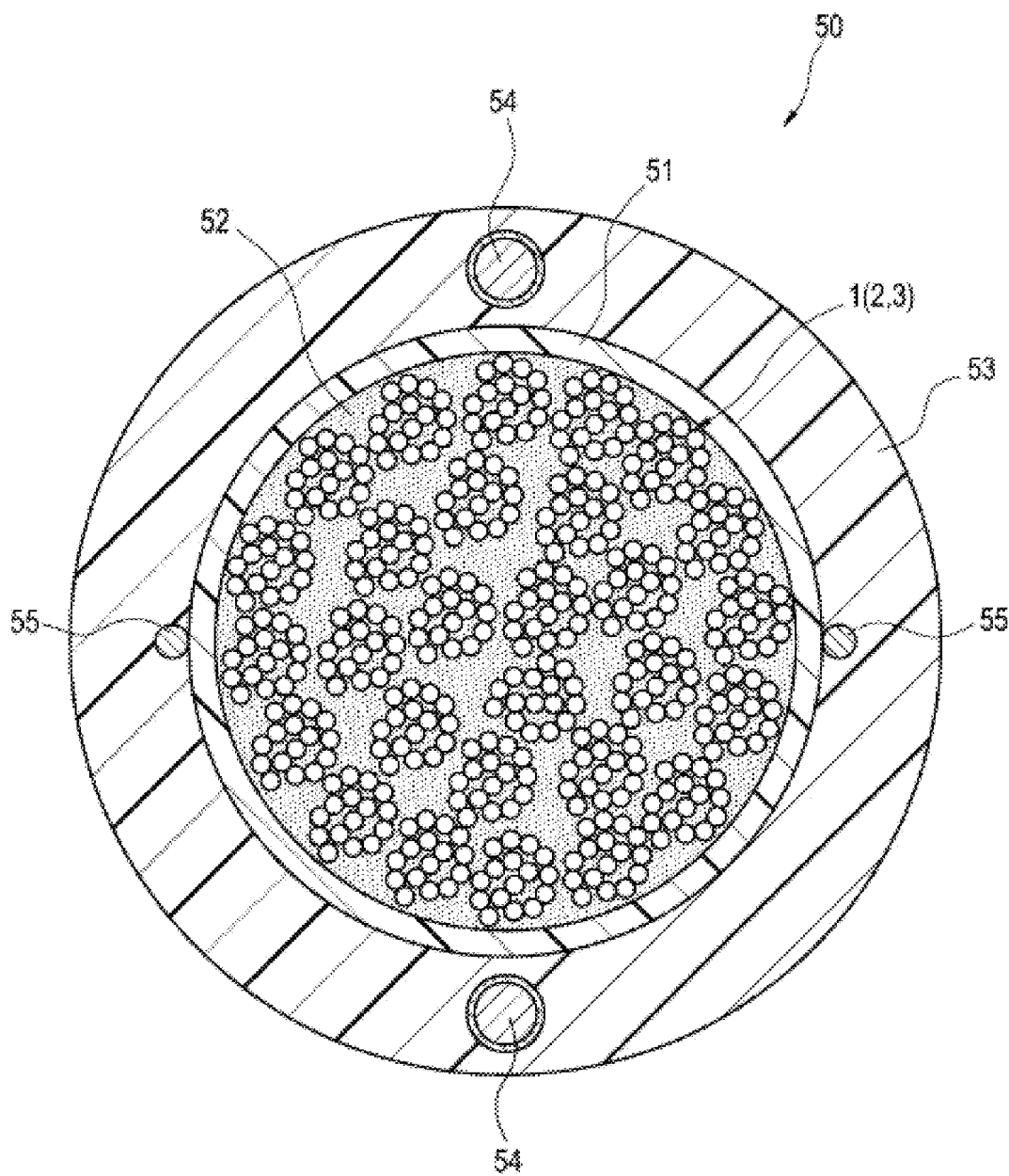
FIG. 8 is a cross-sectional view of an example of an optical fiber cable according to an embodiment of the present disclosure.

FIG. 8 is a view showing an example of a slotless type optical fiber cable using the optical fiber ribbon 1 (2, 3) according to the present embodiment. FIG. 9 is a view showing an example of a slot type optical fiber cable using the optical fiber ribbon 1 (2, 3) according to the present embodiment.

A slotless type optical fiber cable 50 shown in FIG. 8 includes a cylindrical tube 51 and a plurality of optical fiber ribbons 1 (2, 3) mounted in the tube 51. The optical fiber ribbons 1 (2, 3) are gathered in a manner of being rounded, and strand without stranding the optical fiber ribbons 1 (2, 3) back. In addition, a plurality of fillers 52 (tension fibers or the like) are mounted in the tube 51 so as to fill gaps among the optical fiber ribbons 1 (2, 3). A periphery of the tube 51 is covered with a sheath 53. Tension members 54 and tearing strings 55 are embedded inside the sheath 53. Since the optical fiber ribbons 1 (2, 3) are gathered in the manner of being rounded and strand without stranding the optical fiber ribbons 1 (2, 3) back, bending in the width direction of the optical fiber ribbons 1 (2, 3) is less likely to occur.

In the optical fiber cable 50, an optical fiber density of the optical fibers 11 (21, 31) per unit area in a cable cross section is 4.5 optical fibers/mm² or more. When the optical fiber cable is the slotless type optical fiber cable, the optical fiber density is calculated by dividing the number of optical fibers by a cross-sectional area of the optical fiber cable. For example, the slotless type optical fiber cable 50 shown in FIG. 8 includes 448 optical fibers, and when an outer diameter of the optical fiber cable 50 is prepared as 11 mm, the optical fibers 11 (21, 31) can be mounted in the optical fiber cable 50 at an optical fiber density of 4.72 optical fibers/mm².

Figure 9:
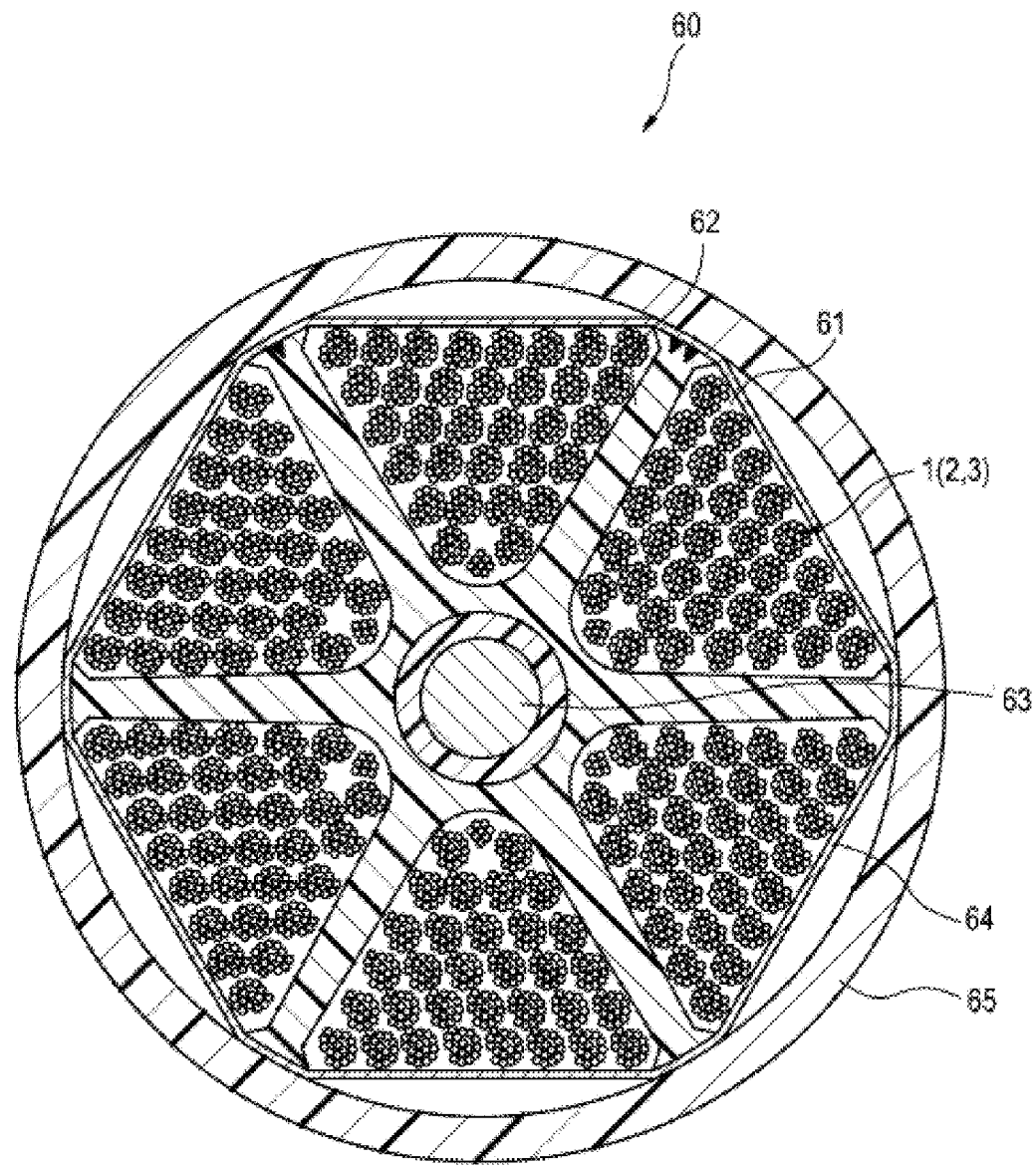
FIG. 9 is a cross-sectional view of another example of the optical fiber cable according to the embodiment of the present disclosure.

A slot type optical fiber cable 60 shown in FIG. 9 includes a slot rod 62 having a plurality of slot grooves 61, and a plurality of optical fiber ribbons 1 (2, 3) mounted in the slot grooves 61. The slot rod 62 includes a tension member 63 at a center, and has a structure in which the plurality of slot grooves 61 are provided radially. The optical fiber ribbons 1 (2, 3) are gathered in the manner of being rounded, and strand without stranding the optical fiber ribbons 1 (2, 3) back, so as to be mounted in the slot grooves 61. A press winding tape 64 is wound around the slot rod 62, and a sheath 65 is formed around the press winding tape 64. Since the optical fiber ribbons 1 (2, 3) are gathered in the manner of being rounded and strand without stranding the optical fiber ribbons 1 (2, 3) back, bending in the width direction of the optical fiber ribbons 1 (2, 3) is less likely to occur.

An optical fiber density of the optical fiber cable 60 is 4.5 optical fibers/mm² or more. For example, the slot type optical fiber cable 60 shown in FIG. 9 includes 3120 optical fibers, and when an outer diameter of the optical fiber cable 60 is prepared as 28 mm, the optical fibers 11 (21, 31) can be mounted in the optical fiber cable 60 at an optical fiber density of 5.07 optical fibers/mm².

According to the optical fiber cable 50 (60), the optical fiber ribbons 1 (2, 3) described above are mounted in the optical fiber cable 50 (60). Therefore, even when the optical fiber ribbon 1 (2, 3) has an optical fiber density of 4.5 optical fibers/mm² or more, even the optical fibers 11 (21, 31) constituting the optical fiber ribbon 1 (2, 3) meander in the optical fiber cable 50 (60), the bending strain is less likely to occur. Therefore, the increase in transmission loss due to the meandering of the optical fibers 11 (21, 31) may be reduced. In the optical fiber cable 50 (60), the optical fiber ribbons 1 (2, 3) are rounded and gathered, and the optical fiber ribbons 1 (2, 3) may be gathered in a state of being arranged in a row without being rounded.

Figure 10:
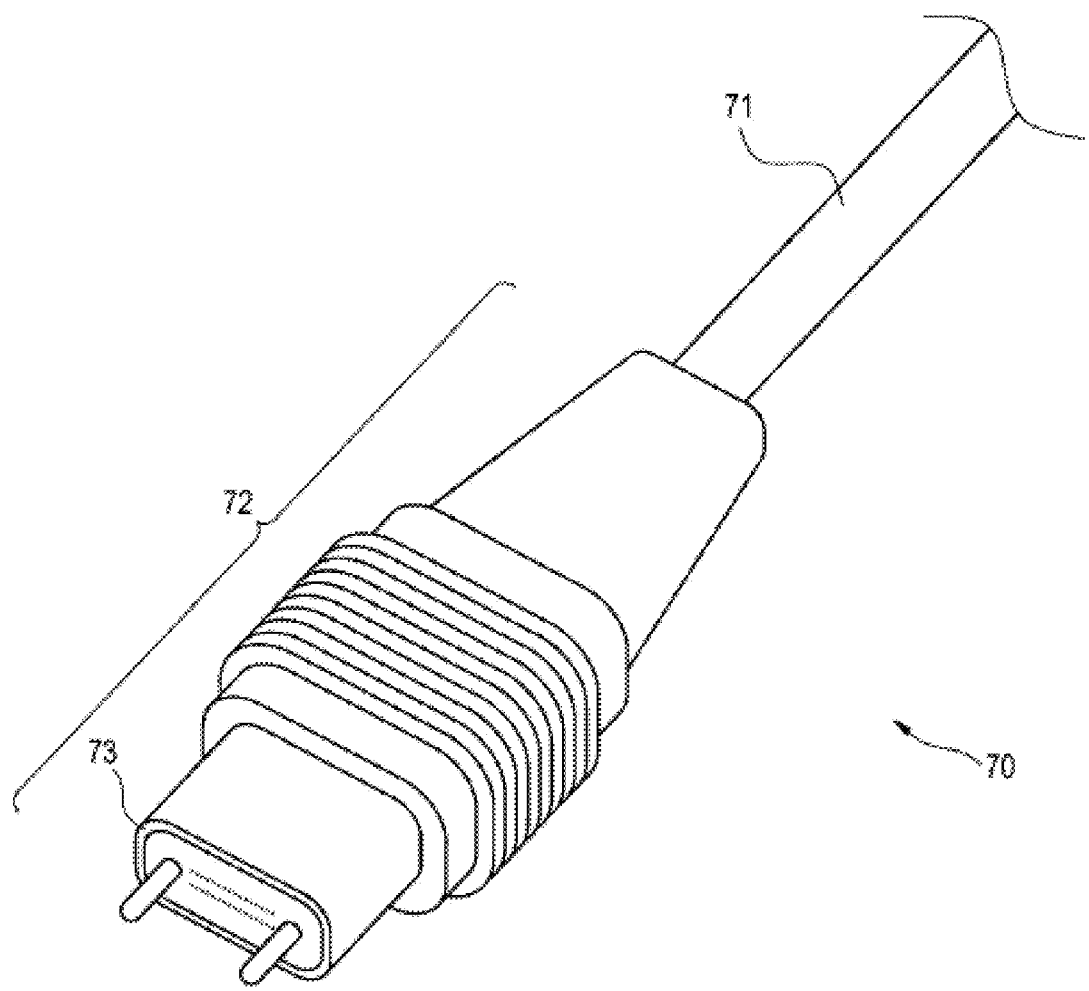
FIG. 10 is a perspective view of an example of a connector-equipped optical fiber cord according to an embodiment of the present disclosure.
Figure 11:
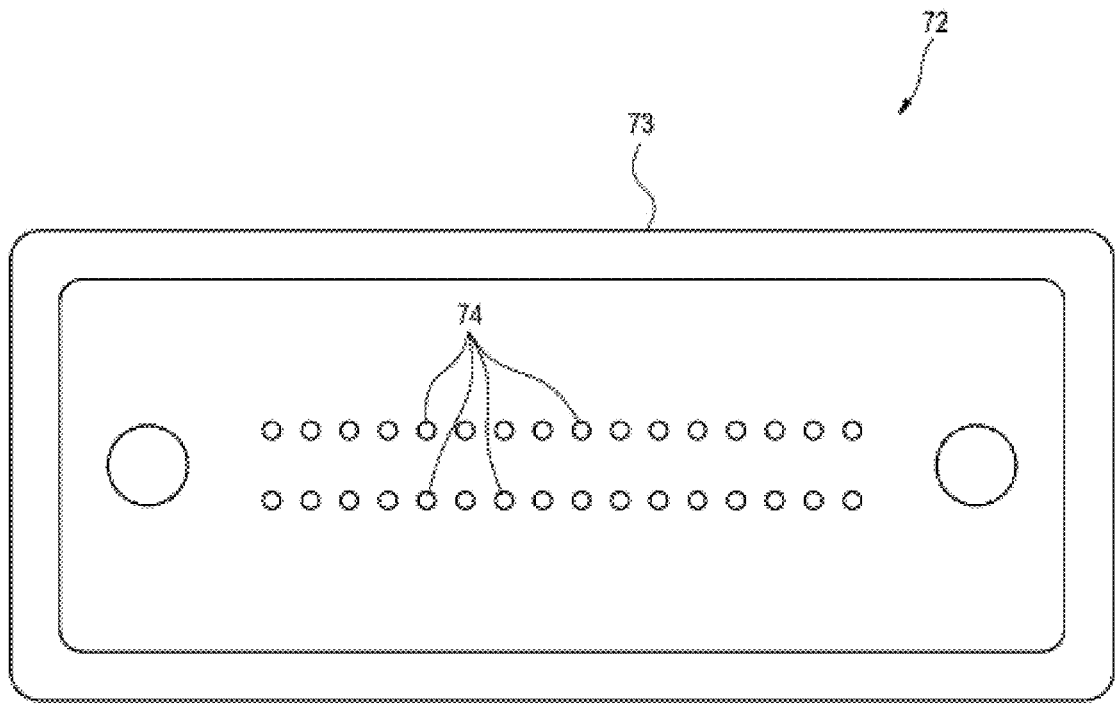
FIG. 11 is a front view of a connector insertion/removal portion in the connector-equipped optical fiber cord shown in FIG. 10.

Next, a connector-equipped optical fiber cord according to the present embodiment will be described with reference to FIGS. 10 and 11. FIG. 10 is a view showing an example of a connector-equipped optical fiber cord using the optical fiber ribbon 1 (2, 3) according to the present embodiment. FIG. 11 is a front view showing a connector insertion/removal portion of the connector-equipped optical fiber cord shown in FIG. 10.

A connector-equipped optical fiber cord 70 shown in FIG. 10 includes an optical fiber cord 71 in which the optical fiber ribbons 1 (2, 3) are mounted, and a connector portion 72 connected to the optical fiber cord 71. For example, two optical fiber ribbons including sixteen optical fibers or one optical fiber ribbon including thirty-two optical fibers are mounted in the optical fiber cord 71. The connector portion 72 is formed of a multi-fiber push-on (MPO) connector that can collectively connect a plurality of optical fibers. As shown in FIG. 11, the connector portion 72 includes an insertion/removal portion 73 to be inserted into or removed from another connector, adapter, or the like. The insertion/removal portion 73 is provided with thirty-two (16 holes×2 rows) through holes 74 into which tip portions of the respective optical fibers 11 (21, 31) of the optical fiber ribbon 1 (2, 3) are inserted.

According to the connector-equipped optical fiber cord 70, the optical fiber ribbons 1 (2, 3) described above are mounted in the optical fiber cord 71. Therefore, even the optical fibers 11 (21, 31) constituting the optical fiber ribbon 1 (2, 3) meander in the optical fiber cord 71, the bending strain is less likely to occur. Therefore, the increase in transmission loss due to the meandering of the optical fibers 11 (21, 31) may be reduced.

Although the present invention are described in detail with reference to the specific embodiment, it will be apparent to those skilled in the art that various changes and modifications can be made without departing from the spirit and scope of the present invention. The numbers, positions, shapes, and the like of components described above are not limited to the embodiment described above and can be changed to suitable numbers, positions, shapes, and the like on a premise that the present invention is achieved.

REFERENCE SIGNS LIST

1, 1A, 1B, 2, 3: optical fiber ribbon
11 (11A to 11P): optical fiber
12, 22, 32: glass fiber
13, 23, 33: primary resin
14, 24, 34: secondary resin
15, 25, 25a, 25b, 35a, 35b: connecting resin
16: connecting portion
17: non-connecting portion
21 (21A to 21P): optical fiber
28 (28A to 28H): double-core optical fiber ribbon
31 (31A to 31P): optical fiber
50, 60: optical fiber cable
51: tube
52: filler
53: sheath
54: tension member
55: tearing string
61: slot groove
62: slot rod
63: tension member
64: press winding tape
65: sheath
70: connector-equipped optical fiber cord
71: optical fiber cord
72: connector portion
73: insertion/removal portion
74: through hole
C: curve line passing through center
D, D1, D2, D3: outer diameter of optical fiber
R: bending radius
r: maximum displacement
RT, RT1, RT2, RT3: thickness of connecting resin covering peripheries of optical fibers at both ends of optical fiber ribbon
S: bending strain
W1, W2, W3: width of optical fiber ribbon

The invention claimed is:

1. An optical fiber ribbon comprising:
   16 or more and 48 or less optical fibers arranged in parallel; and
   a connecting resin that connects adjacent optical fibers of the optical fibers, wherein an outer diameter of each of the optical fibers is 160 μm or more and 220 μm or less,
   when the number of optical fibers is set to N, and a bending strain of the optical fibers is set to S, S=0.167× N/2(%) or less,
   in the optical fibers, when a bending diametery is 20 mm with 1 turn, a bending loss at a wavelength of 1550 nm is 0.75 dB or less, and when the bending diameter φ is 30 mm with 10 turns, the bending loss at the wavelength of 1550 nm is 0.25 dB or less, in the optical fibers at both ends of the optical fiber ribbon in a parallel direction, when the bending diameter φ is 15 mm with 1 turn, the bending loss at the wavelength of 1550 nm is 0.5 dB or less, and when the bending diameter φ is 20 mm with 1 turn, the bending loss at the wavelength of 1550 nm is 0.1 dB or less, and each of the bending losses of the optical fibers at both ends of the optical fiber ribbon in the parallel direction is smaller than the bending loss of any other optical fibers.

2. The optical fiber ribbon according to claim 1, wherein the optical fiber ribbon is an intermittent connection-type optical fiber ribbon in which a connecting portion at which adjacent optical fibers are connected to each other and a non-connecting portion at which adjacent optical fibers are not connected to each other are intermittently provided in a longitudinal direction between a part or all of the optical fibers.

3. The optical fiber ribbon according to claim 1, wherein when an outer diameter of the optical fibers is set to D, the number of optical fibers is set to N, a thickness of a connecting resin covering peripheries of the optical fibers at both ends of the optical fiber ribbon is set to RT, a width W of the optical fiber ribbon in the parallel direction is equal to or less than a value calculated by following expression, $$W = 250 \times (N-1) + D + 2 \times RT (\mu m).$$

4. The optical fiber ribbon according to claim 1, wherein the number of optical fibers is a multiple of eight.

5. The optical fiber ribbon according to claim 1, wherein each of the optical fibers includes a glass fiber, and two coating layers covering a periphery of the glass fiber, an inner coating layer of the two coating layers on an inner side is formed of a primary resin, an outer coating layer of the two coating layers on an outer side is formed of a secondary resin, a Young's modulus of the primary resin at 23° C. is 0.5 MPa or less, and a Young's modulus of the secondary resin at 23° C. is 1000 MPa or more.

6. The optical fiber ribbon according to claim 1, further comprising:

one layer or more of the connecting resin, wherein a Young's modulus of an outermost connecting resin at 23° C. is 200 MPa or less, and a breaking elongation is 30% or more.

7. An optical fiber cable in which the optical fiber ribbon according to claim 1 is mounted, wherein the optical fiber cable has an optical fiber density of 4.5 optical fibers/mm² or more.

8. A connector-equipped optical fiber cord comprising:

an optical fiber cord including the optical fiber ribbon according to claim 1 covered with a sheath; and a connector connected to the optical fiber cord.

* * * * *